United States Patent
Armfield (10) Patent No.: US 8,118,133 B2
(45) Date of Patent: Feb. 21, 2012

(54) PORTAL WHEEL END

(75) Inventor: Jeffrey S. Armfield, Grand Blanc, MI (US)

(73) Assignee: Axletech International IP Holdings, LLC, Troy, MI (US)

( * ) Notice: Subject to any disclaimer, the term of this patent is extended or adjusted under 35 U.S.C. 154(b) by 201 days.

(21) Appl. No.: 12/501,273

(22) Filed: Jul. 10, 2009

(65) Prior Publication Data

US 2010/0007198 A1    Jan. 14, 2010

Related U.S. Application Data

(60) Provisional application No. 61/134,461, filed on Jul. 10, 2008.

(51) Int. Cl.
*B60K 17/04* (2006.01)
*B60K 17/30* (2006.01)

(52) U.S. Cl. .......................... 180/371; 180/255

(58) Field of Classification Search .............. 180/355, 180/356, 363, 371, 372, 373, 252, 253, 255; 301/132, 111.03
See application file for complete search history.

(56) References Cited

U.S. PATENT DOCUMENTS

| | | | |
|---|---|---|---|
| 1,914,683 A * | 6/1933 | Clapper et al. | 180/211 |
| 2,076,009 A * | 4/1937 | Starr et al. | 180/9.6 |
| 2,432,708 A * | 12/1947 | Ash | 280/93.512 |
| 3,191,708 A | 6/1965 | Simonds et al. | |
| 3,420,327 A * | 1/1969 | Nallinger et al. | 180/255 |
| 3,434,364 A * | 3/1969 | Keese | 74/391 |
| 3,822,757 A * | 7/1974 | Spence | 180/255 |
| 4,100,988 A * | 7/1978 | Hildebrecht | 180/371 |
| 4,132,134 A * | 1/1979 | Avery et al. | 475/343 |
| 4,344,501 A * | 8/1982 | Jerry et al. | 180/253 |
| 4,733,743 A * | 3/1988 | Weiss et al. | 180/255 |
| 6,398,240 B1 | 6/2002 | Taylor | |
| 6,695,738 B2 | 2/2004 | Sullivan et al. | |
| 6,964,317 B2 | 11/2005 | Groves et al. | |
| 2006/0027411 A1 * | 2/2006 | Bordini | 180/253 |
| 2006/0027414 A1 * | 2/2006 | Bordini | 180/363 |
| 2006/0207384 A1 | 9/2006 | Hardy et al. | |

OTHER PUBLICATIONS

Headquarters, Departments of the Army, the Air Force, and Marine Corps, Technical Manual, Army TM 9-2320-280-24P-1, Air Force TO 36A12-1A-3044-1, Marine Corps TM 2320-24P/8B, Volume No. 1, Mar. 2001, 6 pages.

Headquarters, Department of the Army, Technical Manual, Army TM 5-2420-224-24P-1, Nov. 30, 2001, 5 pages.

* cited by examiner

*Primary Examiner* — Paul N Dickson
*Assistant Examiner* — Wesley Potter
(74) *Attorney, Agent, or Firm* — Howard & Howard Attorneys PLLC (57) ABSTRACT

A modular portal wheel end system allows for connection of a portal wheel end to any of a plurality of differently configured axles for vehicles. The portal wheel end includes a housing that houses an input gear and an output gear. The input gear is coupled to the axle to which the portal wheel end is connected. A wheel hub is coupled to the output gear. A plurality of adapter brackets are each configured to be interchangeably connected to the housing and the axle. Each adapter bracket has a different predetermined configuration for connection to a separate one of the differently configured axles. The portal wheel end system allows the same housing, input gear, output gear, and wheel hub to be connected to any of the differently configured axles with the use of the appropriate adapter bracket.

23 Claims, 11 Drawing Sheets

PORTAL WHEEL END

CROSS-REFERENCE TO RELATED APPLICATIONS

The subject patent application claims priority to and all the benefits of U.S. Provisional Patent Application No. 61/134,461, which was filed on Jul. 10, 2008.

BACKGROUND OF THE INVENTION

1. Field of the Invention

The subject invention relates to a portal wheel end for connection to an axle of a vehicle to increase the ground clearance of the axle.

2. Description of the Related Art

Portal wheel ends are often connected to an axle of a vehicle to increase the ground clearance of the vehicle. Prior art portal wheel ends typically include a wheel hub with a tire is mounted to the wheel hub. The portal wheel end includes a housing that is connected to the axle and houses an input gear and an output gear. The input gear receives rotational input from the axle and the output gear is coupled to the input gear and to the wheel hub to transfer the rotational input to the wheel hub. The input gear is higher than the output gear, which increases the ground clearance of the axle.

Portal wheel ends are used in a wide variety of applications including military vehicles and aftermarket applications for off-road vehicles. Several different makes and models of axles exist. Each different axle has a different configuration, which in turn defines different locations of mounting arrangements for the portal wheel end and different packaging constraints for placement adjacent the portal wheel end. The portal wheel end must be configured to accommodate for the specific mounting arrangement and packaging constraints of the axle in order to be properly connected to the axle. As such, a different portal wheel end must be designed and manufactured for each of these differently configured axles so that the housing of the portal wheel end can accommodate the specific mounting arrangement and packaging constraints of the specific axle for which the portal wheel end is designed to be connected. In other words, the portal wheel end is typically only used with one specific make and model of axle.

The cost of portal wheel ends is detrimentally increased due to the design and manufacturing costs associated with designing and manufacturing a different portal wheel end for each of the differently configured axles. These costs are especially increased, and even prohibitive, in lower volume production, such as for off-road vehicles that have uncommon axles. As such, there remains a need to develop a portal wheel end that is more modular in nature and can have a majority of its components used in a variety of different applications.

SUMMARY OF THE INVENTION AND ADVANTAGES

The present invention includes a modular portal wheel end system for connection to a plurality of differently configured axles for vehicles. The modular portal wheel end system comprises a housing for being selectively coupled with any one of the plurality of differently configured axles. An input gear is supported by the housing and is rotatable about a first rotational axis for receiving rotational input from any one of the plurality of differently configured axles. An output gear is supported by the housing and is coupled to the input gear with the output gear rotatable about a second rotational axis offset from the first rotational axis. A wheel hub is coupled to the output gear. A plurality of adapter brackets are each configured to be interchangeably connected to the housing and each have a different predetermined configuration for connection to a separate one of the plurality of differently configured axles for coupling the housing to any one of the plurality of differently configured axles.

The present invention also includes a portal wheel end for connection to an axle of a vehicle. The portal wheel end comprises a housing for being selectively coupled with any one of a plurality of differently configured axles. An input gear is supported by the housing and is rotatable about a first rotational axis for receiving rotational input from any one of the plurality of differently configured axles. An output gear is supported by the housing and is coupled to the input gear with the output gear rotatable about a second rotational axis offset from the first rotational axis. A wheel hub is coupled to the output gear. An adapter bracket extends from the housing and has a predetermined configuration for connection to a selected one of the plurality of differently configured axles. The adapter bracket is formed separately from and connected to the housing for coupling the housing to the selected one of the plurality of differently configured axles.

Accordingly, by connecting the appropriate bracket to the housing, the portal wheel end system can be used to attach the portal wheel end to any one of the plurality of differently configured axles. Accordingly, the same housing, input gear, output gear, and wheel hub can be used with any of the plurality of differently configured axles. Such a configuration advantageously reduces the design and manufacturing costs associated with producing a different portal wheel end for each of the differently configured axles.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
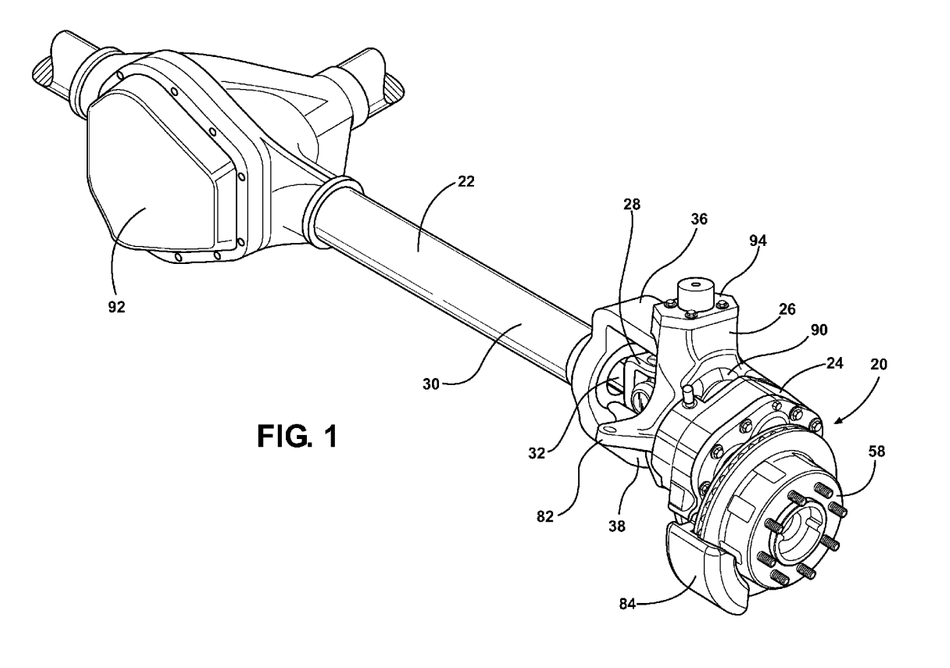
FIG. 1 is a perspective view of a portal wheel end connected to an axle.
Figure 9:
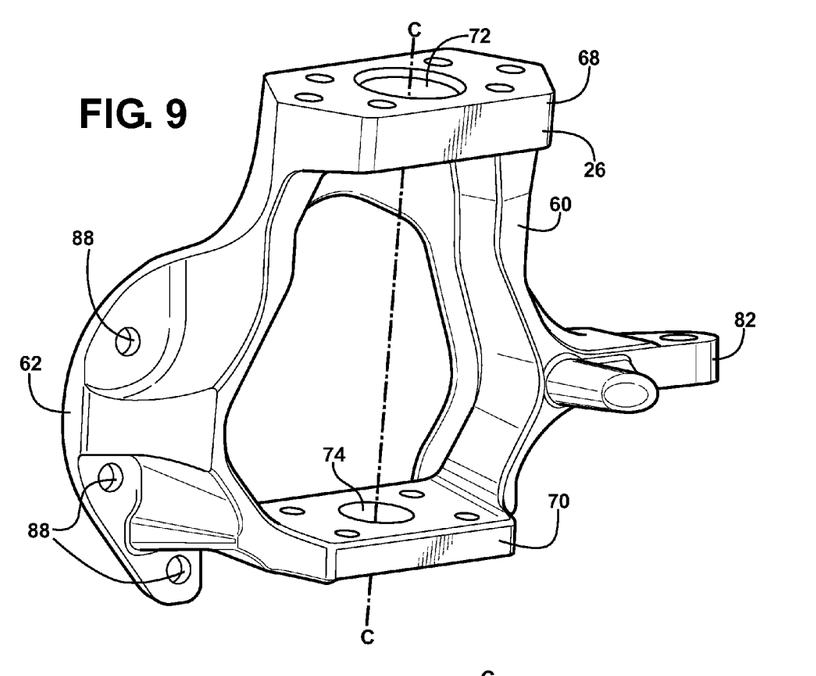
FIG. 9 is a perspective view of one embodiment of the adapter bracket.
Figure 10:
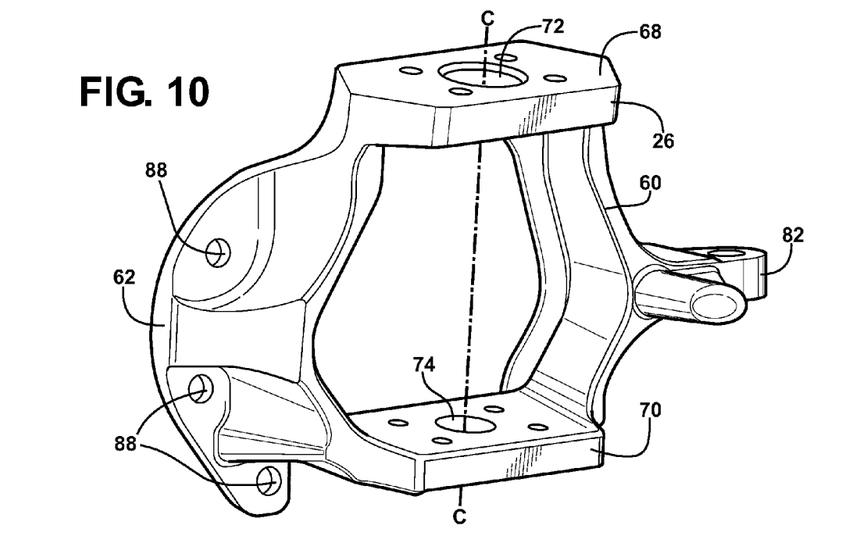
FIG. 10 is perspective view of another embodiment of the adapter bracket.
Figure 11:
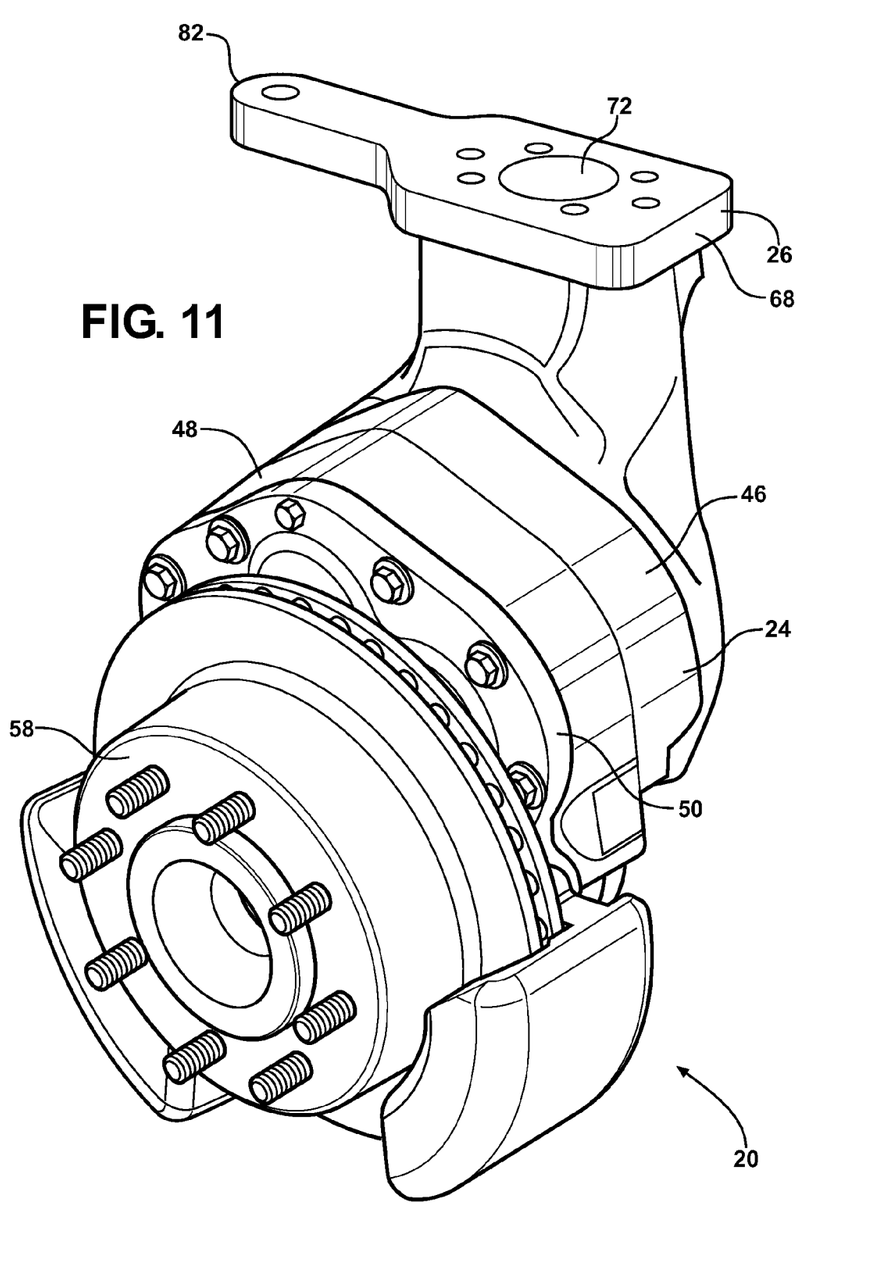
FIG. 11 is a perspective view of another embodiment of the portal wheel end.

Referring to the Figures, wherein like numerals indicate like parts throughout the several views, a portal wheel end is shown generally at 20. The portal wheel end 20 is connected to an axle 22 of a vehicle (not shown). A portion of the axle 22 including a differential 92 is shown in FIG. 1. As discussed further below, the portal wheel end 20 has a modular configuration that includes a housing 24 and an adapter bracket 26 connected to the housing 24 and to the axle 22, as best shown in FIG. 1. A portal wheel end system includes a plurality of adapter brackets 26 that can be interchangeably connected to the housing 24. For example, three different adapter brackets 26 are shown in FIGS. 9-11. Each of the adapter brackets 26 are configured to connect to one 24 of a plurality of differently configured axles such that the portal wheel end system can be used to assemble the portal wheel end 20 for use with any one of the differently configured axles.

Figure 6:
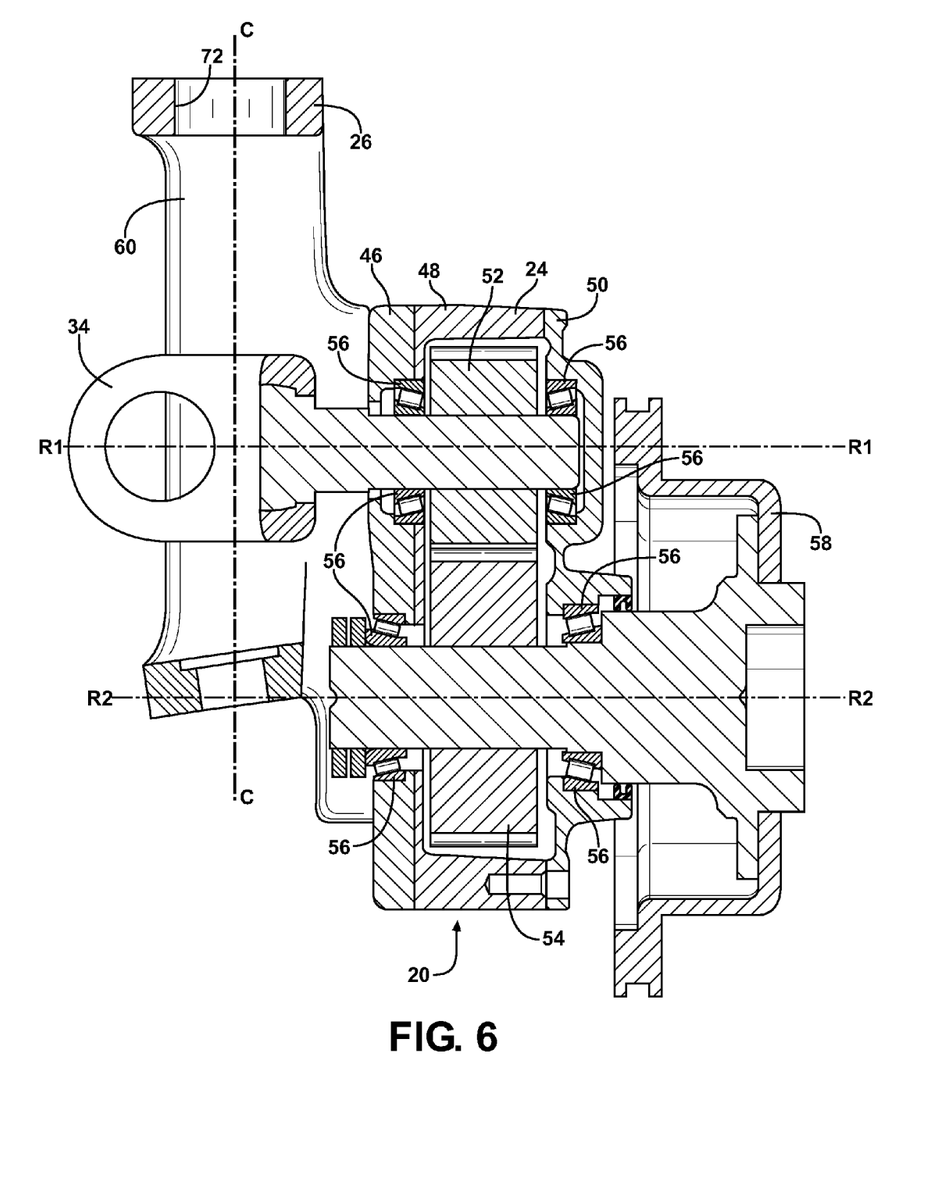
FIG. 6 is a cross-sectional view of the portal wheel end through line 6-6 of FIG. 4.
Figure 8:
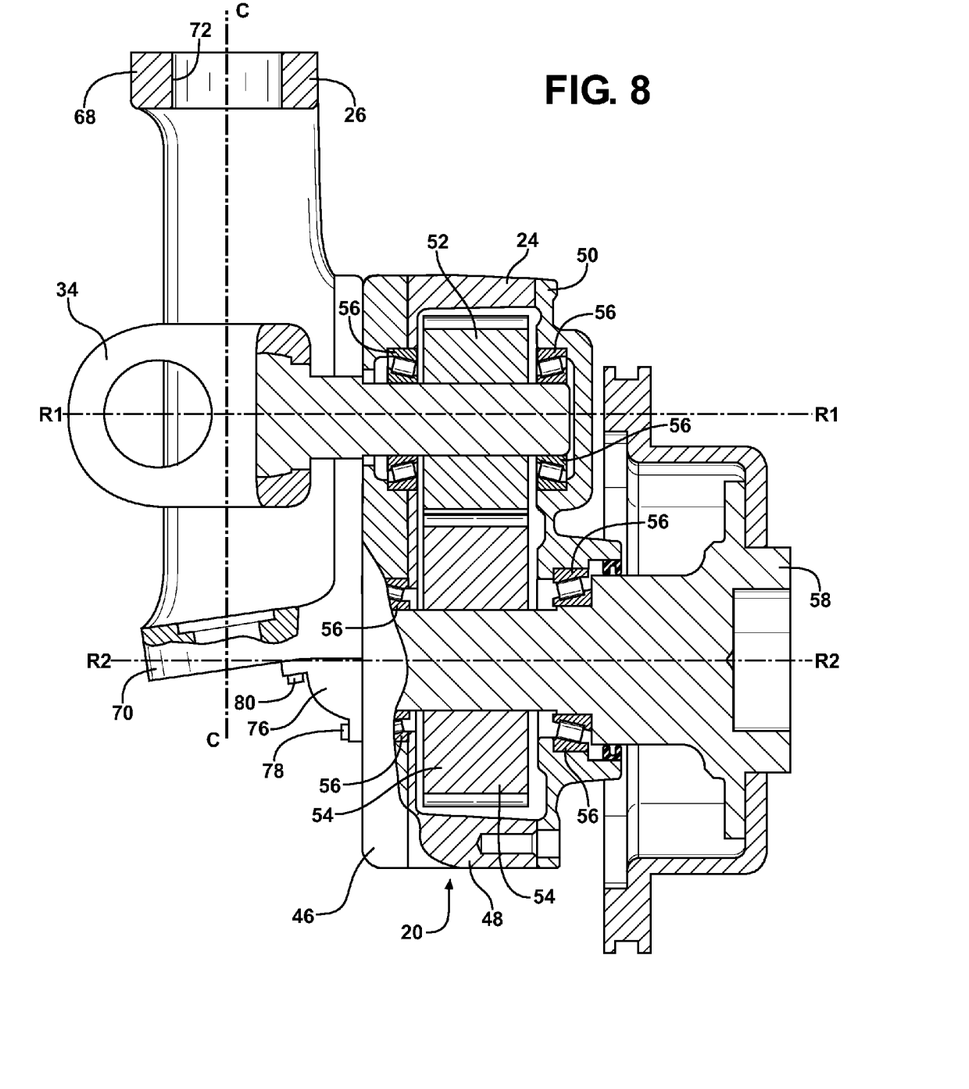
FIG. 8 is another cross-sectional view of the portal wheel end including a brace connected to a housing and an adapter bracket of the portal wheel end.

The portal wheel end 20 receives rotational input from the axle 22 along a first rotational axis R1, as best shown in FIGS. 6 and 8, and transfers the rotational input to a wheel hub 58 along a second rotational axis R2 offset from the first rotational axis R1. As set forth further below, the portal wheel end 20 increases the ground clearance of the axle 22 because the first rotational axis R1 is parallel to and higher than the second rotational axis R2.

Figure 2:
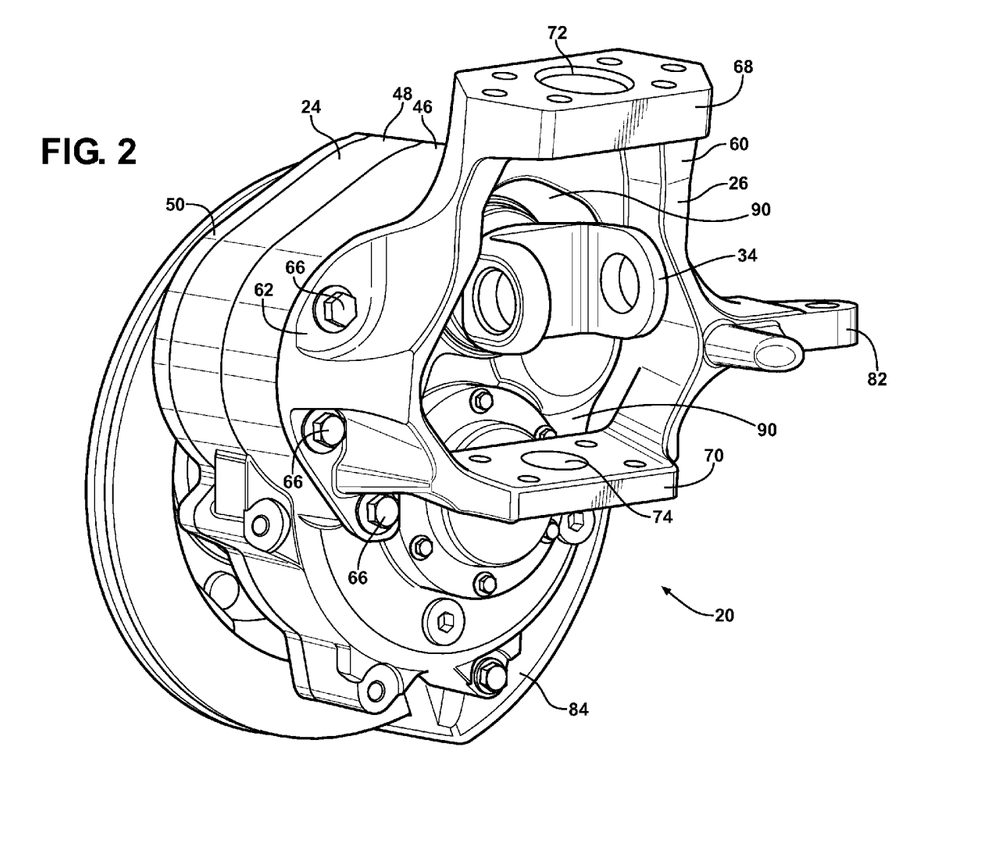
FIG. 2 is a perspective view of the portal wheel end.
Figure 3:
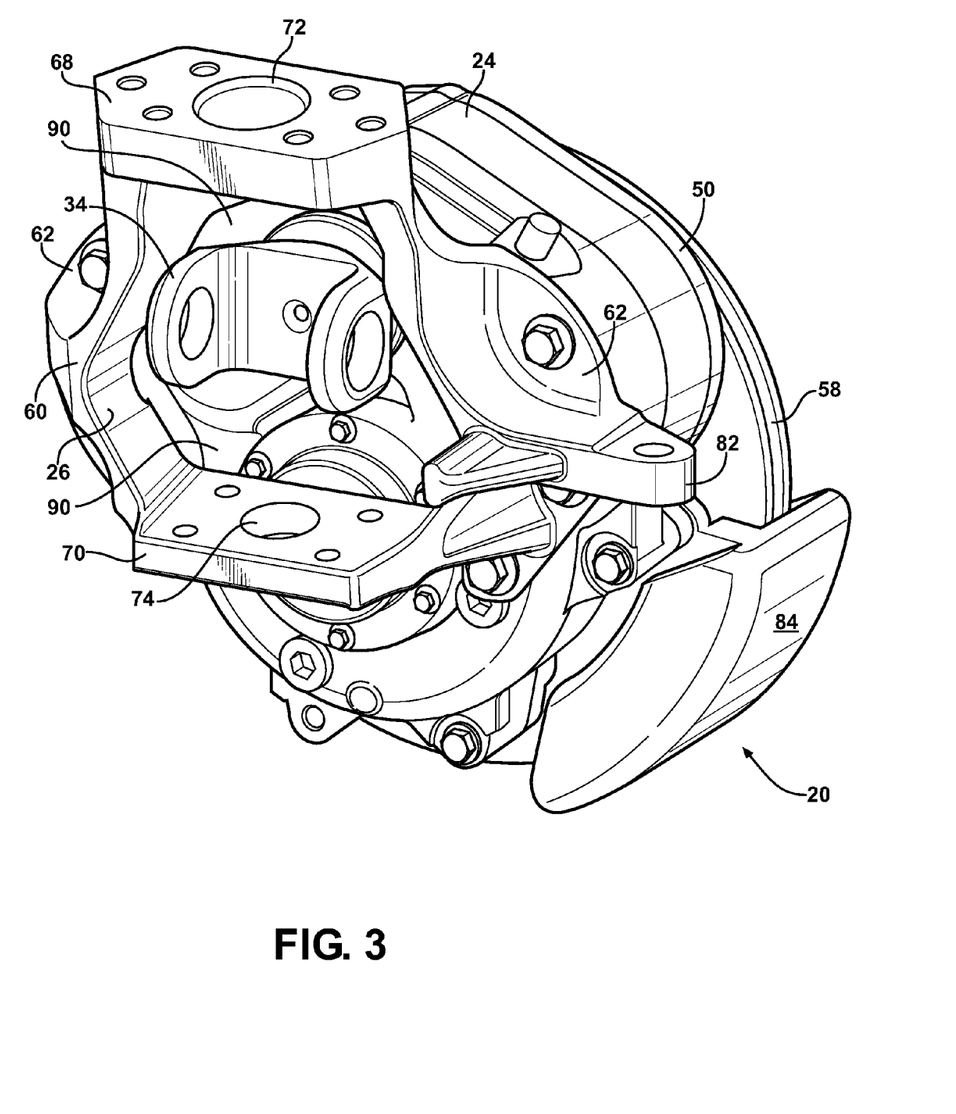
FIG. 3 is another perspective view of the portal wheel end.
Figure 4:
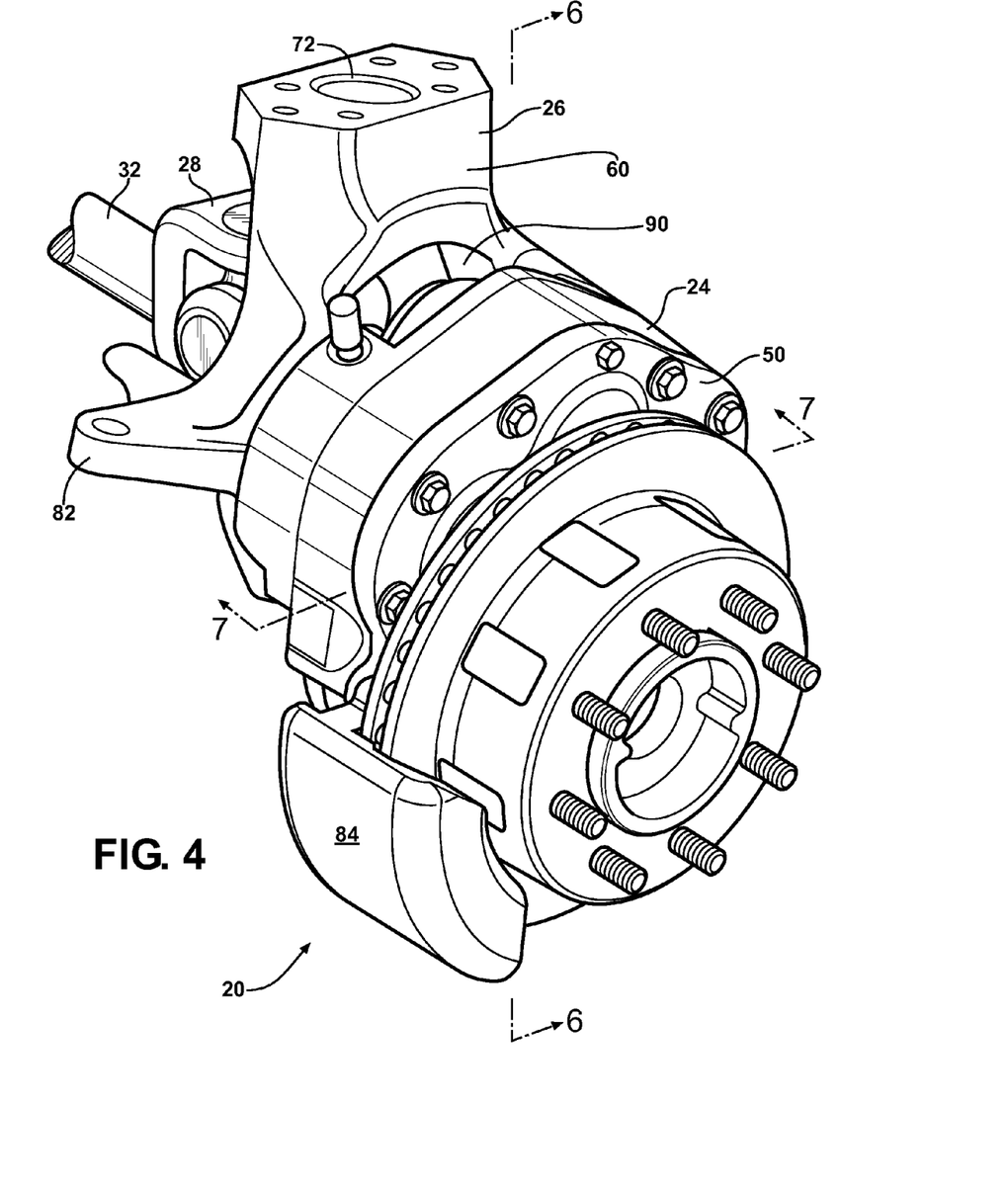
FIG. 4 is a perspective view of the portal wheel end connected to an axle shaft of the axle.

As shown in FIG. 1, the axle 22 includes an axle housing 30 and an axle shaft 32 rotatable within the axle housing 30. The axle shaft 32 engages the portal wheel end 20 to transfer rotational input to the portal wheel end 20. The axle 22 can be a steering axle, i.e., for steering the vehicle, such that the axle shaft 32 and the portal wheel end 20 are connected via a universal joint. As best shown in FIGS. 2 and 3, the portal wheel end 20 includes a yoke 34 that comprises half of the universal joint and the axle shaft 32 typically includes another yoke 28 that comprises the other half of the universal joint. The yoke 34 can be removable from the portal wheel end 20 such that the yoke 34 can be replaced with a substitute yoke 34 to accommodate for varying configurations of different yokes 28 of the plurality of different axles. Alternatively, the portal wheel end 20 can be fixed relative to the axle 22, i.e., a non-steer axle.

The axle housing 30 is supported by the vehicle. The portal wheel end 20 is connected to and supported by the axle housing 30. Referring again to FIG. 1, in the configuration where the axle 22 is of the steering axle type, the axle housing 30 includes an upper arm 36 and a lower arm 38. The upper arm 36 typically includes an upper connection point (not shown), e.g., an upper ball joint or kingpin, and the lower arm 38 typically includes a lower connection point (not shown), e.g., a lower ball joint or kingpin. An example of an upper kingpin assembly 94 is shown in FIG. 1. The upper and lower connection points connect to the housing 24 of the portal wheel end 20 and allow the portal wheel end 20 to pivot about a connection point axis C. Alternatively, in the configuration where the axle 22 is of the non-steering type, the portal wheel end 20 is typically bolted to the axle housing 30.

Axles exist in several different makes and models. Each different make and model typically has a unique configuration such that a plurality of differently configured axles exist. As set forth further below, the portal wheel end 20 is modular and can easily modified to connect with any one of the plurality of differently configured axles.

Figure 5:
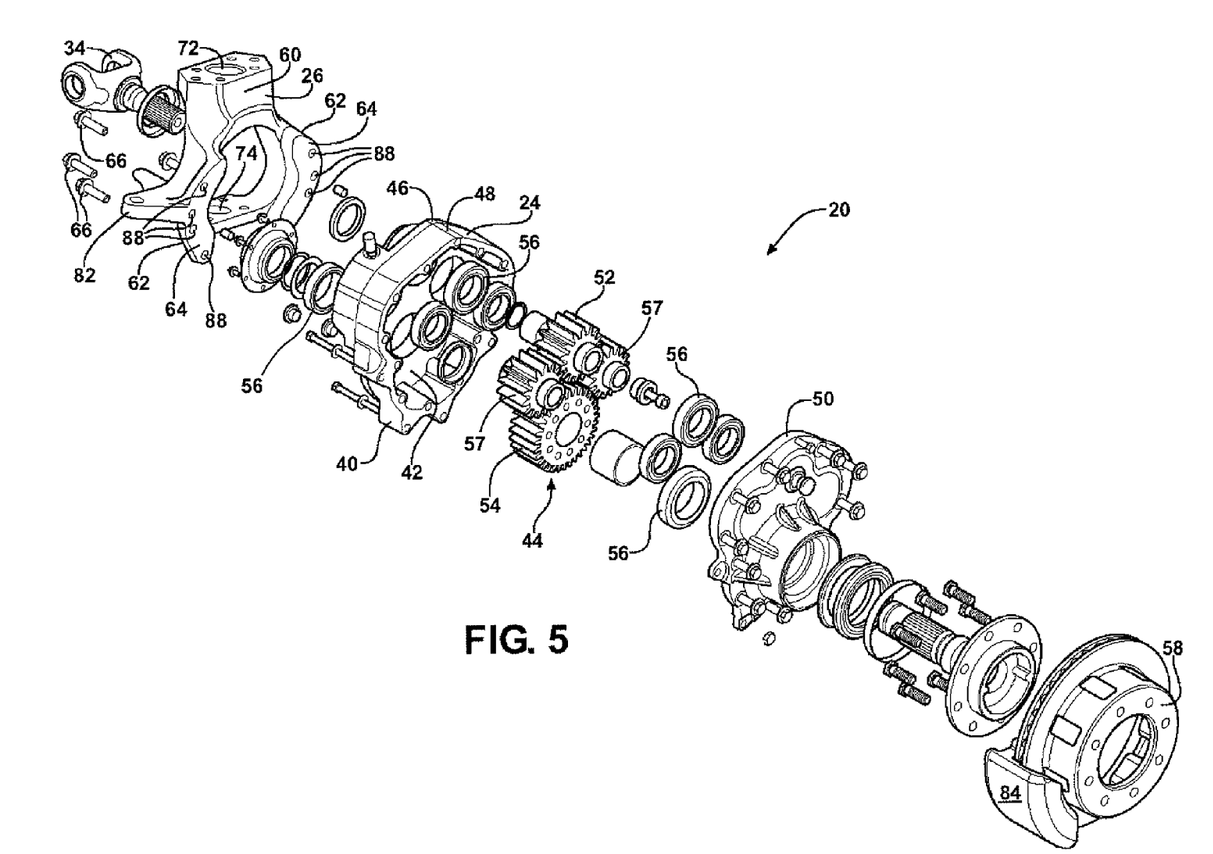
FIG. 5 is an exploded view of the portal wheel end.

As best shown in FIG. 5, the housing 24 of the portal wheel end 20 includes a main portion 40 defining a cavity 42, which houses a reduction gear system 44. Specifically, the main portion 40 of the housing 24 is split having an inner half 46 and an outer half 48. The inner half 46 and the outer half 48 may be bolted together. A cover 50 is removably connected to an outer edge of the outer half 48 by a plurality of threaded fasteners. The cover 50 allows access to the reduction gear system 44.

Figure 7:
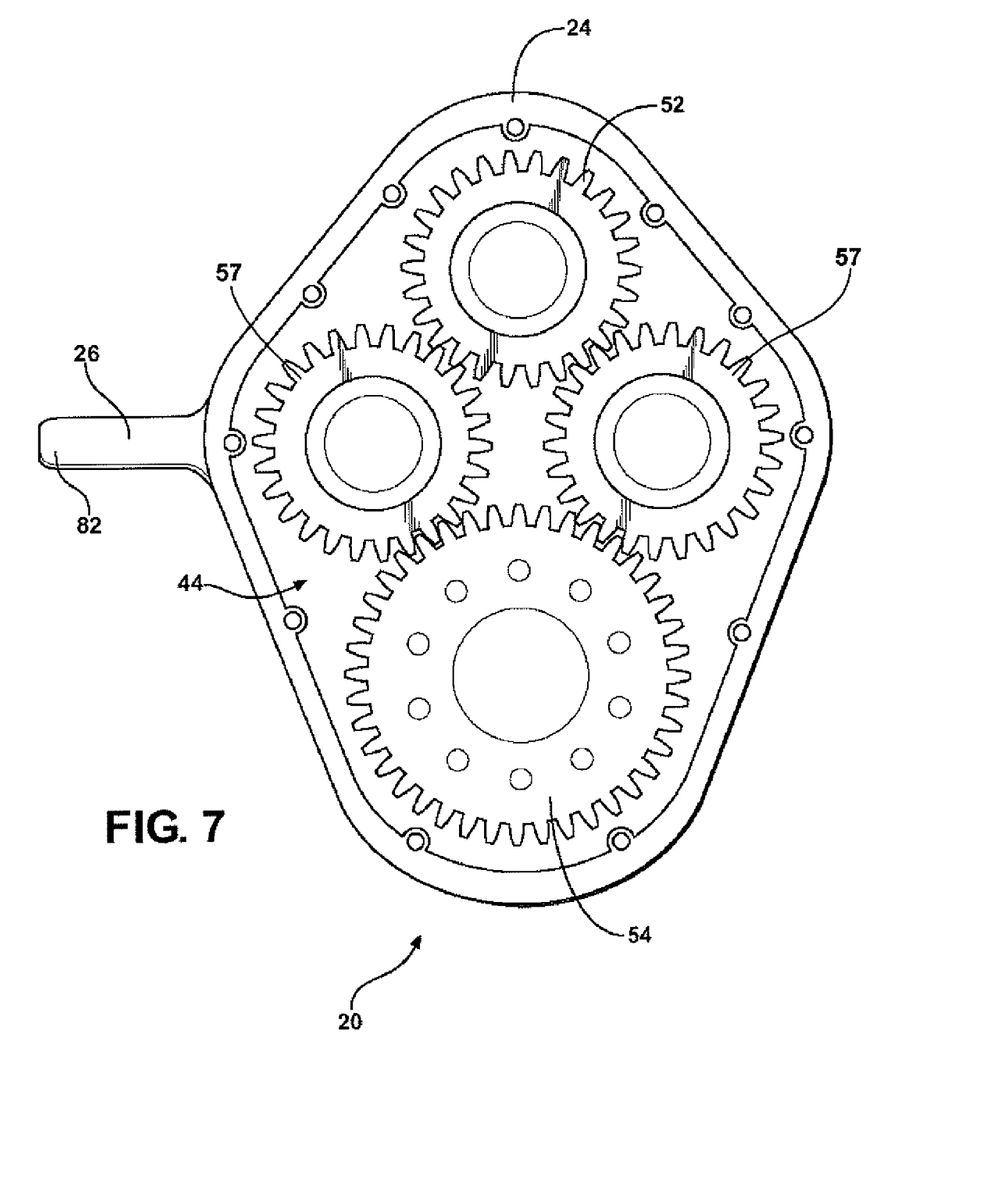
FIG. 7 is another cross-sectional view of the portal wheel end through line 7-7 of FIG. 4.

As shown in FIGS. 5-7, the reduction gear system 44 includes an input gear 52, an output gear 54, and two idler gears 57. The input gear 52, the output gear 54, and the idler gears 57 are rotatably supported by the housing 24, and more specifically by bearings 56 between the inner half 46 and the outer half 48 of the housing 24.

The output gear 54 is coupled to the input gear 52. Specifically, the input gear 52 receives a rotational input from the axle 22 and is in meshing engagement with the idler gears 57 for rotating the idler gears 57. The idler gears 57 are in meshing engagement with the output gear 54 for rotating the output gear 54. The input gear 52 is rotatable abut the first rotational axis R1 and the output gear 54 is rotatable about the second rotational axis R2, which, as set forth above, is offset from the first rotational axis R1 to increase the ground clearance of the axle 22. It should be appreciated that the reduction gear system 44 may include a variable gear reduction between the ratios of 1.5 to 1.0 by altering the size of the input gear 52, the output gear 54, and the idler gears 57 respectively.

Figure 12:
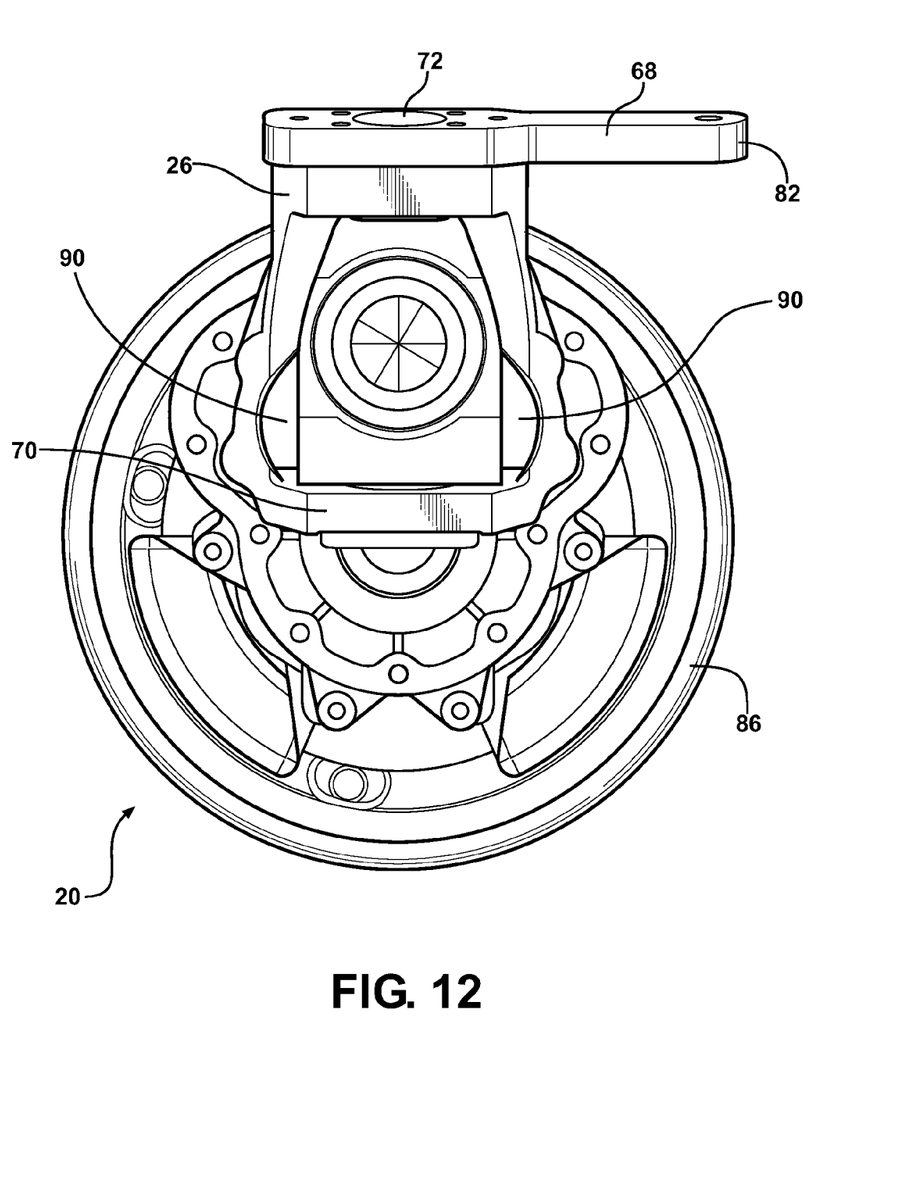
FIG. 12 is a perspective view of the portal wheel end of FIG. 11 including a wheel hub.

As shown in FIG. 12, a wheel hub 58 is connected to the output gear 54 for rotation therewith. A wheel 86 is mounted to the wheel hub 58 for supporting a tire.

As set forth above, the portal wheel end system includes a plurality of adapter brackets 26. The adapter brackets 26 are interchangeably connected to the housing 24, i.e., only one adapter bracket 26 is connected to the housing 24 at any one time such that one adapter bracket 26 can be disconnected from the housing 24 and another adapter bracket 26 can be subsequently connected to the housing 24. Two different adapter brackets 26 are shown in isolation in FIGS. 9 and 10 and a third adapter bracket 26 is shown in FIG. 11.

Each adapter bracket 26 has a different predetermined configuration, i.e., geometric configuration, for connection to a selected one 22 of the plurality of differently configured axles. In other words, each of the plurality of adapter brackets 26 corresponds to a different one 22 of the plurality of differently configured axles. The predetermined configurations of the adapter brackets 26 are described further below.

As best shown in FIGS. 9 and 10, each adapter bracket 26 includes a body 60 and a flange 62 extending from the body 60. Typically, each adapter bracket 26 includes a pair of flanges 62 that flare outwardly from the body 60 transversely to the first rotational axis R1. The flange 62 abuts the housing 24 when the adapter bracket 26 is connected to the housing 24.

The adapter bracket 26 is formed separately from and connected to the housing 24. The adaptor bracket 26 is mounted to the rear of the inner half 46 of the housing 24 adjacent the axle 22 to which the portal wheel end 20 is mounted. The housing 24 has a mounting surface 64 and the flange 62 abuts the mounting surface 64 of the housing 24 when the adapter bracket 26 is connected to the housing 24. The flange 62 is complementary in configuration to the mounting surface 64. In other words, contours of the flange 62 match contours of the mounting surface 64 such that the flange 62 is flush with the mounting surface 64 when connected to the housing 24.

As best shown in FIGS. 2 and 3, fasteners 66 extend through the flanges 62 and into threaded holes (not shown) in the mounting surface 64 for connecting the adapter bracket 26 to the housing 24. Specifically, the flanges 62 define apertures 88 and the fasteners 66 extend through the apertures 88. Regardless of the different predetermined configurations of each of the adapter brackets 26, the pattern and spacing of the apertures 88 of each adapter bracket 26 are the same such that each adapter bracket 26 can be mounted to the same housing 24, i.e., such that the fasteners 66 align with the threaded holes in the mounting surface 64 when extending through the apertures 88. The fasteners 66 are typically threaded bolts. Alternatively, the fasteners 66 could be of any type without departing from the nature of the present invention.

The portal wheel end 20 allows for the disconnection of one of the adapter brackets 26 from the housing 24 and the subsequent connection of another adapter bracket 26 to the housing 24. Specifically, if the portal wheel end 20 is to be connected to a selected one of the differently configured axles, the adapter bracket 26 that corresponds to that selected one of the differently configured axles is connected to the housing 24 for coupling the housing 24 to the selected one of the plurality of differently configures axles.

Referring again to FIGS. 9 and 10, the body 60 includes a first ledge 68 and a second ledge 70 spaced from the first ledge 68 below the first ledge 68. The body 60 defines a first hole 72 in the first ledge 68 and a second hole 74 in the second ledge 70. The first hole 72 and the second hole 74 are each spaced from the housing 24 when connected to the housing 24. The first hole 72 and the second hole 74 are spaced from each other along the connection point axis C, i.e., a ball joint axis or a kingpin axis, extending transverse to the first rotational axis R1 and the second rotational axis R2 for connection to the axle 22. The first hole 72 receives the upper connection point, e.g., the upper ball joint or kingpin, and the second hole 74 receives the lower connection point, e.g., the lower ball joint or kingpin, to connect the portal wheel end 20 to the axle 22.

The predetermined configuration is further defined as locating at least one of the first hole 72 and second hole 74 relative to the housing 24. In other words, the differently configured axles each present the upper and lower connections at different locations. As such, the adapter bracket 26 that corresponds to the selected one 22 of the plurality of axles has the first hole 72 and the second hole 74 located relative to the housing 24 to properly receive the upper and lower connections. As such, the location of the first hole 72 and the second hole 74 are part of the predetermined configuration such that the first hole 72 and the second hole 74 of the adapter bracket 26 align with the upper and lower connections, respectively.

As shown in FIG. 8, each portal wheel end 20 can include a brace 76 connected to and extending between the housing 24 and the body 60 for increasing the rigidity of the adapter bracket 26. The brace 76 extends from the inner half 46 of the housing 24 upwardly and inwardly toward the adaptor bracket to define a triangular brace area between the adapter bracket 26, the inner half 46 of the housing 24, and the brace 76. The brace 76 is typically fastened to the housing 24 and the body 60. Specifically, a first brace fastener 78 extends through the brace 76 and into the housing 24 and a second brace 80 fastener extends through the brace 76 and into the body 60. It should be appreciated that any number of first brace fastener 78 and the second brace fastener 80 can be used to fasten the brace 76 to the housing 24 and the body 60.

The predetermined configuration includes locating the brace 76 relative to the housing 24 and the body 60. Each of the differently configured axles has varying packaging constraints, i.e., clearances, in the area adjacent the portal wheel end 20. As such, the brace 76 is located relative to the housing 24 and the body 60 to fit within these packaging constraints presented by the selected one 22 of the plurality of axles to which the portal wheel end 20 is connected.

As best shown in FIGS. 2 and 3, the adapter bracket 26 defines a gap 90 between the body 60 and the housing 24 when the adapter bracket 26 is connected to the housing 24. The gap 90 is defined at least between the first ledge 68 and the housing 24 and between the second ledge 70 and the housing 24. This gap 90 advantageously reduces the weight of the portal wheel end 20 and the amount of material used to form the portal wheel end 20. The predetermined configuration includes locating the gap 90 relative to the housing 24 and the body 60. The gap 90 also provides distinct mounting points, e.g., the flanges 62, for more efficient mounting of the adapter bracket 26 to the housing 24. In other words, the gap 90 aligns with the housing 24 such that the adapter bracket 26 can be easily placed against the housing 24 in the proper orientation for connecting the adapter bracket 26 to the housing 24.

As set forth above, each of the differently configured axles have varying clearances in the area adjacent the portal wheel end 20. The gap 90 is located relative to the housing 24 and the body 60 to accommodate these differently configured axles by eliminating interference with the axle 22 while maintaining functional stability and rigidity.

As set forth above, the portal wheel end 20 can be advantageously connected to any of the plurality of differently configured axles. Specifically, the adapter bracket 26 corresponding to the selected axle 22 can be connected to the housing 24 to couple the housing 24 to the selected axle 22. Accordingly, to attach the portal wheel end 20 to a selected axle 22, the correct adaptor bracket corresponding to that selected axle 22 is mounted to the inner half 46 of the housing 24, thereby permitting the portal wheel end 20 to be mounted to that selected axle 22. By changing the adaptor bracket, the portal wheel end 20 is attachable to a different make and model of axle. Accordingly, the same housing 24, reduction gear system 44, and wheel hub 58 may be mounted to the different makes and models of axles by simply changing the adaptor bracket. When the proper adapter bracket 26 is connected to the housing 24, the input gear 52 of the portal wheel end 20 can receive rotational input from the axle 22, i.e., the input gear 52 can receive rotational input from any one 22 of the plurality of differently configured axles when the housing 24 is connected to the axle 22 with the proper adapter bracket 26.

A steering arm 82 extends from the adapter bracket 26 for connection with steering components of the vehicle. As best shown in FIGS. 2 and 3, the steering arm 82 can be a lower steering arm. Typically, the lower steering arm is integrally formed with the adapter bracket 26, but can alternatively be formed separately from the adapter bracket 26 and subsequently connected. Alternatively, as shown in FIGS. 11 and 12, the steering arm 82 can be an upper steering arm. Typically, the upper steering arm is fastened to the adapter bracket 26, but can alternatively be formed integrally with the adapter bracket 26.

As best shown in FIGS. 2 and 3, a braking system 84 is mounted to the housing 24. Typically, the braking system 84 includes a disk braking system; however it should be appreciated that the braking system may include other type of braking systems.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A modular portal wheel end system for connection to a plurality of differently configured axles for vehicles, said portal wheel end system comprising:

a housing for being selectively coupled with any one of the plurality of differently configured axles;

an input gear supported by said housing and rotatable about a first rotational axis for receiving rotational input from any one of the plurality of differently configured axles;

an output gear supported by said housing and coupled to said input gear with said output gear rotatable about a second rotational axis offset from said first rotational axis;

a wheel hub coupled to said output gear; and a plurality of adapter brackets each configured to be interchangeably connected to said housing and each having a different predetermined configuration for connection to a separate one of the plurality of differently configured axles for coupling said housing to any one of the plurality of differently configured axles.

2. The portal wheel end system as set forth in claim 1 wherein each of said adapter brackets includes a body and a flange extending from said body and abutting said housing when said adapter bracket is connected to said housing.

3. The portal wheel end system as set forth in claim 2 wherein said adapter bracket defines a gap between said body and said housing when said adapter bracket is connected to said housing.

4. The portal wheel end system as set forth in claim 2 wherein said body defines a first hole and a second hole each spaced from said housing when connected to said housing with said first hole and said second hole spaced from each other along a kingpin axis extending transverse to said first axis and said second axis for connection to the axle.

5. The portal wheel end system as set forth in claim 4 wherein said predetermined configuration is further defined as locating at least one of said first and second holes relative to said housing.

6. The portal wheel end system as set forth in claim 2 wherein said housing has a mounting surface and wherein said flange abuts said mounting surface of said housing when said adapter bracket is connected to said housing.

7. The portal wheel end system as set forth in claim 6 wherein said flange is complementary in configuration to said mounting surface.

8. The portal wheel end system as set forth in claim 6 further including fasteners extending through said flange and into said mounting surface for connecting said adapter bracket to said housing.

9. The portal wheel end system as set forth in claim 2 further including a brace connected to and extending between said housing and said body for increasing the rigidity of the adapter bracket.

10. The portal wheel end system as set forth in claim 9 wherein said predetermined configuration is further defined as locating said brace relative to said housing and said body.

11. The portal wheel end system as set forth in claim 9 further including a first brace fastener extending through said brace and into said housing and a second brace fastener extending through said brace and into said body.

12. The portal wheel end as set forth in claim 1 wherein said housing includes a main portion defining a cavity with said input gear and said output gear disposed in said cavity and a cover removably connected to said main portion for allowing access to said input gear and said output gear.

13. The portal wheel end as set forth in claim 1 further including a steering arm extending from said adapter bracket for connection with steering components of the vehicle.

14. A portal wheel end for connection to an axle of a vehicle, said portal wheel end comprising:

a housing for being selectively coupled with any one of a plurality of differently configured axles;

an input gear supported by said housing and rotatable about a first rotational axis for receiving rotational input from any one of the plurality of differently configured axles;

an output gear supported by said housing and coupled to said input gear with said output gear rotatable about a second rotational axis offset from said first rotational axis;

a wheel hub coupled to said output gear; and an adapter bracket extending from said housing and having a predetermined configuration for connection to a selected one of the plurality of differently configured axles;

said adapter bracket formed separately from and connected to said housing for coupling said housing to the selected one of the plurality of differently configures axles.

15. The portal wheel end as set forth in claim 14 wherein said adapter bracket includes a body and a flange extending from said body and abutting said housing when said adapter bracket is connected to said housing.

16. The portal wheel end as set forth in claim 15 wherein said adapter bracket defines a gap between said body and said housing when said adapter bracket is connected to said housing.

17. The portal wheel end as set forth in claim 15 wherein said body defines a first hole and a second hole each spaced from said housing for connection to the selected one of the plurality of differently configured axles with said first hole and said second hole spaced from each other along a kingpin axis extending transverse to said first axis and said second axis for connection to the axle.

18. The portal wheel end as set forth in claim 17 wherein said predetermined configuration is further defined as locating at least one of said first and second holes relative to said housing.

19. The portal wheel end as set forth in claim 15 wherein said housing has a mounting surface and wherein said flange abuts said mounting surface of said housing when said adapter bracket is connected to said housing.

20. The portal wheel end as set forth in claim 19 wherein said flange is complementary in configuration to said mounting surface.

21. The portal wheel end as set forth in claim 19 further including fasteners extending through said flange and into said mounting surface for connecting said adapter bracket to said housing.

22. The portal wheel end as set forth in claim 15 further including a brace connected to and extending between said housing and said body for increasing the rigidity of the adapter bracket.

23. The portal wheel end as set forth in claim 15 wherein said predetermined configuration is further defined as locating said brace relative to said housing and said body.

* * * * *